United States Patent Office 3,485,686
Patented Dec. 23, 1969

3,485,686
AQUEOUS EXPLOSIVE SLURRY CONTAINING OXIDIZER-REDUCER CROSS-LINKING AGENT
Harvey A. Jessop and Lex L. Udy, Salt Lake City, Utah, assignors to Intermountain Research Engineering Company, Inc., a corporation of Utah
No Drawing. Filed May 31, 1968, Ser. No. 733,319
Int. Cl. C06b 1/04, 19/00
U.S. Cl. 149—41          13 Claims

ABSTRACT OF THE DISCLOSURE

A slurry blasting agent of the aqueous type containing oxidizers such as ammonium nitrate, sodium nitrate, etc., with enough liquid to suspend undissolved particles and form a continuous phase, said particles including fuels and/or sensitizers such as carbonaceous materials, aluminum powder, sulfur, etc., is thickened with a gum or equivalent thickener which is highly cross-linked by use of very small proportions of redox system (oxidizer and reducer materials). Preferred oxidizers are alkali metal dichromates especially sodium dichromate. Reducers comprise organic acids and their derivatives, such as tannic acid, gallic acid, certain tartrates and citrates, etc., such as potassium antimony tartrate.

BACKGROUND AND PRIOR ART

The use of aqueous explosive slurries containing strong inorganic oxidizer salts such as ammonium nitrate, sodium nitrate, the chlorates, perchlorates, etc., dissolved or partly in solution in an aqueous phase, has been of increasing importance in recent years. Compositions of this type are commonly sensitized with suspended finely divided particles of fuels and/or sensitizers which are not soluble or at least not entirely soluble, in the aqueous medium. The latter may be all water, or may be an aqueous solution containing water soluble organic liquids such as glycols, alcohols, aldehydes, amides, etc., especially ethylene glycol, formamide, and the like. Sensitizers are of various kinds, such as finely divided aluminum small self-explosive particles of TNT, RDX and/or other explosives, including smokeless powder, carbonaceous materials such as finely divided gilsonite or bituminous coal, and may include water soluble fuels such as sugar and other carbohydrates. Small proportions of fine aluminum powder may be used along with larger amounts of various fuels, and slurries containing various other fuels, including sulfur, have come into prominent use in recent years. These explosive slurries have commonly been thickened to hold the particles in suspension and increase resistance to ground water intrusion by the use of colloidal materials or gel formers such as flours or starches, e.g. wheat flour, tapioca starch, and the like, or more commonly by the use of various natural and synthetic gums. The galactomannan gums such as guar gum have been widely used. Other gums may be used in lieu of guar, e.g., other glactomannans, such as locust bean gum, extracts from various plants and plant products, synthetic products such as carboxymethyl cellulose and the like. It has been suggested in prior art that cross-linking by means of certain metal compounds becomes more effective when a small amount of base, such as alkali metal hydroxide, carbonate, etc., is added to the composition to increase the pH factor. Such use of bases, and of control ingredients in general, often is undesirable when it can be avoided. It involves additional steps and may cause stability problems. The applicants have found alternative and superior ways to obtain desired cross-linking without such, making pH control generally unnecessary. The use of thickening systems of this type has been suggested, in various food products as well as in explosives.

The present invention is primarily related to explosives but it is not limited thereto, as it has numerous other applications.

According to the present invention it has been found possible to obtain extremely efficient cross-linking with very small quantities of thickener and even smaller quantities of cross-linking agents without adding base or even attempting the keep the pH of the slurry within the limits of about 6 to 7 as some have thought to be necessary.

For convenience, the present cross-linking system may be called a redox (oxidizer-reducer) system, since it involves the use of two agents, one of which is a reducer and the other an oxidizer. These agents are employed in very small or even trace quantities in conjunction with a cross-linking gum, preferably a glactomannan such as guar gum, in small quantities. By proper timing of the redox reaction, the viscosity of the composition and also its rate of thickening may be closely controlled. Thus a gelled or thickened blasting slurry, or other gelled material, can be prepared with suitable body or viscosity for short time stability, or for longer storage, different body or gel structure, etc., as desired. Furthermore, the rate of gelation may be controlled quite accurately. The latter is particularly important in connection, e.g. with explosive slurry pumping systems. Where explosives of the slurry type are forcibly pumped from a mixer, or from temporary storage, through delivery hoses or pipes to a point of use, such as a large borehole or a packaging station, this viscosity or gel control is very useful. Viscous compositions are needed for stability and for water resistance but it is not practical to pump highly viscous explosives. Explosives of low viscosity flow freely and are readily pumpable but may be too liquid to retain the essential fuel and/or sensitizing particles in homogeneous dispersion, such as fine particles of aluminum, carbonaceous particles such as powdered gilsonite, coal, sugars and other carbohydrates, etc., or particles of self-explosives such as mentioned above.

In the prior art cross-linking agents, such as borax, are known and it is known also that it is often necessary to control the alkalinity of a solution in order to maintain a stable gel structure. Borax cross-linked thickeners have been used quite widely but they tend to have poor particle suspension characteristics, even in relatively thick slurries, because the cross-link entity appears to migrate and shift from place to place within the gel. This apparently permits settling and stratification of the suspended solids. Such segregation often cannot be tolerated, particularly in an explosive system where homogeneous distribution of these particles, and consequent uniform sensitization, is highly essential to complete detonation and to good explosive performance.

According to the present invention, highly effective cross-linking can be obtained by using relatively small parts of gum, preferably pre-hydrated guar gum, usually without adding a base, and generally with relatively low pH in the slurry. This is accomplished by using very small proportions of an oxidizing type cross-linker. This may be one of a type frequently used for cross-linking of gelatins, etc., as in photography. In the present case it is combined with small quantities of a reducing agent. The latter may be one or more appropriate organic acids, e.g. gallic acid, tannic acid, and others, or their derivatives, which have per se a cross-linking activity, especially when used in larger quantities. However, in the quantities used in the present invention these acids usually would be quite ineffective by themselves. Oxidizers having some cross-linking properties per se, such as sodium or potassium chromate, may be used but others such as $H_2O_2$ which are not cross-linking by themselves also can be used. Chromates and dichromates in general are useful and permanganates also may be used. The combination of oxidizer and reducers for cross-linking is vastly more powerful than single oxidizers for gels of this invention. They make a more stable system, better adapted to stabilize the gels and hold suspended particles in homogeneous suspension, particularly particles which have densities different from that of the liquid. This will be shown further below.

DESCRIPTION OF PREFERRED EMBODIMENT

The invention can be explained by referring first to a number of specific examples where the cross-linking was found to be highly effective. Typical and more or less conventional slurry explosive compositions were made up, starting first with an aqueous solution of strong explosive oxidizer salts. In a first example, a solution was comprised of 31.5 parts by weight, based on the total finished slurry, of ammonium nitrate, 13.5 parts of sodium nitrate, 15 parts of water, and 0.15 part of hydrated guar gum. To incorporate the guar gum ("GG") in the solution just described, 0.3 part by weight of ethylene glycol ("EG") were used. Such a system, cross-linked in the manner described below, thickens very rapidly at first and becomes quite viscous in a short time. However, its viscosity declines considerably after about three hours and sometimes much sooner. After twenty-four hours viscosity generally is further reduced so much that the suspended sensitizing particles of aluminum, undissolved nitrate, gilsonite, etc., in the slurry may begin to segregate badly. This decline in viscosity can be cured by increasing the amount of guar gum slightly, but this may create a problem of pumping the slurry through a hose. In a composition containing 0.17 to 0.18 parts of guar gum per 100 parts of slurry and cross-linked as described above, the viscosity quickly becomes about as great as can be conveniently tolerated with a conventional pump truck system.

It is desirable, obviously, to stabilize the cross-link in such a way that it will hold at or near maximum strength for longer periods, particularly where long time storage is contemplated, as in pumping an explosive slurry into a borehole, and leaving it there several days before detonating it. Where boreholes are filled and the charges exploded within a few hours this usually is not a problem, but where several days may elapse before detonation, particular care must be taken that the cross-linked gel retains its body. That is, it must not weaken so much as to permit excessive leaching by borehole water or segregation and settling of suspended particles of aluminum, carbonaceous materials, TNT pellets, and the like, which are essential to full detonation.

Using the same solution of the primary oxidizers AN and SN, as described above, a series of tests were made employing a dry so-called "pre-mix" of suspendable sensitizing material. In this case, the "pre-mix" was made up of 6 parts of powdered gilsonite ("Gil"), 3 parts of sulfur, 0.3 part of fine flaked paint grade aluminum, and 1.7 parts of a somewhat coarser aluminum, designated "C-99." Also 28.5 parts by weight of dry ammonium nitrate were added to the slurry, separately from the "pre-mix." In such compositions the guar gum thickener is pre-dissolved and well hydrated in the oxidizer solution before the dry pre-mix and the supplemental dry oxidizer (AN in this case) are added thereto.

Using the slurry composition just described as a control, a 50/50 solution of sodium chromate ($Na_2Cr_2O_7/H_2O$) in water (designated "N-O" for convenience) and a potassium antimony tartrate $K(SbO)C_4H_6O_5.H_2O$ (designated "N-R" for convenience) were added in various but very small proportions. In one case, a small amount of borax was added also. In another, a small amount of a lignin sulfonate was added. This was obtained from Crown-Zellerbach under the trade name "Orzan S." In still other cases an acid, e.g. tannic or gallic acid was used instead of the tartrate. Tartaric acid itself can be used also but it appears to be less effective. The results of tests, some including special additives, are shown in Table 1. Initial thickening is the degree of thickening attained after 20 seconds of mixing and standing time and the various degrees of thickening are measured by dropping a cone-shaped weight into the gel to obtain penetration. An arbitrary hardness scale was estimated visually, a number of 0 representing apparent complete resistance to water washing, and a number of 5 representing essentially no resistance to water. The penetration readings were taken, in general, three minutes after the materials were mixed. Stability or loss of thickening effect after various periods is indicated in the remarks.

TABLE I.—STABILIZERS FOR N-O/N-R SYSTEM

[31.5 AN/13.5 SN/15 H₂O/.15 GG/.3 EG//6 Gil/3 Sul/0.3 3WA/1.7 C-99//28.5 Dry AN]

| N-O | N-R | Additive | Initial thickening | P | Stability, remarks |
|---|---|---|---|---|---|
| .05 | .002 | Control (no additive). | 0-1 hard | 183 | Loses much X-link in about 3 hours. After 6 hours is not properly holding the AN prills in suspension. |
| .08 | .0005 | Control | 2½ | | |
| .05 | .0005 | .025 Borax | 1-1½ | 290 | Better crosslink and stronger than control after one day. |
| .25 | .003 | Sodium lignin sulfonate (.25) in the oxidizer solution. | 1½ | 240 | Not as good as borax but much better than control after one day. Fairly strong after 20 hrs. After 3 days about same. Fairly strong after one week (considered good for this amount of gum). |

Where thickener is added dry, as in the "pre-mix," the long range stability of the thickener appears to be somewhat improved, but larger quantities of gum are required. Substantial economies are obtained by using less. Tests were performed using a dry but oil-coated guar gum in the "pre-mix" to slow down cross-linking, also incorporating both "redox" cross-linking agents in the dry pre-mix. Results, including penetration in the standard penetrometer, are shown in Table II.

TABLE II

[42 AN/15 SN/15 H₂O/.3 GG/.6 EG//+pre-mix of Table I and enough AN (dry) to make]

| No. 1 | .5% GG in pre-mix coated with 10 drops pine oil/10 g. Guar plus .005 N-R/.2 N-O in dry mix. | 180 pen. But after a few hours two-thirds of the coated gum becomes effective. Not as well cross-linked as No. 2, below. |
|---|---|---|
| No. 2 | Same as No. 1 but twice the coating of oil (20 drops/10 g.). | 140 pen. Better cross-lined than No. 1, but not as strong as No. 4. |
| No. 3 | Same as 2 but No. 2 fuel oil used as the coating. | 140 pen. After ½ hr. it looks better than No. 1 and about equivalent of No. 2. |
| No. 4 | Same as No. 3 but .02 N-7A added. | 190 penetration after about 15 min. After 24 hours is more stable than 1, 2 or 3. |

When uncoated guar gum was used, with the oxidizers and the reducer in the dry mix, the unhydrated guar precipitated, so this was unsatisfactory.

In another series of tests tannic acid was used as the reducing agent instead of the potassium antimony tartrate. The reaction was somewhat slower than that in Table I, but tannic acid is quite satisfactory in combination with sodium dichromate. It is sufficiently rapid in cross-linking to provide good water resistance in a typical slurry within about 20 seconds. It is about ten times as fast as tartaric acid. However, for solutions pumped at temperatures below 50° C., wherein thickening takes place more slowly, it may be too slow for some applications. From this viewpoint the potassium antimony tartrate is somewhat better than tannic acid. Both are considerably better than tartaric acid. Results of the tannic acid tests are summarized in Table III.

flour and guar gum in the dry pre-mix does not appear to be justified at all.

For hot weather use, mixtures are usually somewhat different since less sensivity is required and a higher "fudge point," i.e. temperature where the slurry congeals and becomes semi-solid as it cools, can be tolerated. In such cases, most or all of the oxidizer salt can be put in the solution by heating it. The solution for a typical hot weather mix was made up of 54 parts by weight, based on the total composition, of ammonium nitrate, 15 parts sodium nitrate, and 15 parts water. In this were included 0.1% of water-aluminum reaction inhibitor (ammonium phosphate), and 0.3% of guar gum. The gum is prehydrated and may be placed in the solution without a dispersing agent or with 0.5 parts of ethylene glycol. The dry pre-mix consisted of about 5 parts of sulfur, 5 parts of powdered gilsonite, 0.25 parts of guar gum and 0.5

TABLE III.—N-O/ TANNIC ACID AND GUAR GUM IN "PRE-MIX"

[42 AN/15 SN/15 H₂O/.25 GG/.5 EG//same dry ingredients as in Table II]

| | Dry GG | N-0 | Tannic acid | Initial thickening | P | Stability |
|---|---|---|---|---|---|---|
| No. 1 | | .1 | .01 | 0 | 190 | Holding well at 48 hours. Has pretty good cross-link. Soft but no segregation. |
| No. 2 | | .05 | .01 | 0 | 250 | About same at 48 hrs. as No. 1. |
| No. 3 | | .075 | .02 | 0 | 190 | At 48 hrs. a little stronger than Nos. 1 and 2. |
| No. 4 | .2 | .075 | .02 | 1–1½ | 130 | Stronger than No. 3. |
| No. 5 | .3 | .075 | .02 | 1½–2 | 160 | A little tacky initially but at 48 hrs. better than No. 4. Far better than No. 1. |
| No. 6 | 3 | .075 | .02 | 1½–2 | 370 | Took longer to obtain a good gel structure but at 48 hours looks about same as No. 5. |

Other materials have been used experimentally as alternatives for the reducer, in lieu of the potassium antimony tartrate and the gallic acid. These include antimony lactate, antimony tartrate, tin chloride, pyrogallol, catechol, phenol and resorcinol. Some of these were less satisfactory than others but all those tested were found to be useful. Gallic acid showed some activity in compositions having as high a pH as 7.7, but compositions containing it had essentially no water resistance at lower pH.

Gallic and tannic acids were very satisfactory in explosive slurries mixed at temperatures above about 45° C. However, at lower mixing temperatures their thickening rates are slow, unsatisfactory where rapid thickening is needed. It appears that some of the aromatic hydroxyl compounds mentioned above, such as catechol, gallic acid and pyrogallol, may have utility because their hydroxyl groups are in ortho positions, that is, adjacent to one another, but compositions containing these compounds appear to lose their cross-link after storage unless the pH is kept low. For resorcinol and phenol there are no adjacent hydroxyl groups and initial results with them were not as good, although final stability appeared to be somewhat better, where no pH control was involved.

It is noted also that these reducing compounds which work fairly well in the system using the gum in the original solution, fail quite completely where there is no gum or other thickener in the oxidizer solution. Gum added with the dry particulate fuels and other solids apparently does not hydrate and cross-link in the same manner.

Instead of using guar gum as the exclusive thickening agent, it is possible to use a small amount of guar gum and supplement it with less potent thickeners such as tapioca flour or other starches. However, with the redox cross-linking system described above, a small amount of guar gum placed initially in the solution is so much more effective that the use of starches, even though they cost less per pound, generally is not economical. At intermediate temperatures slurries are improved even more than in cold weather mixes. In such slurries the use of tapioca parts of a fine flaked paint grade aluminum. As dry oxidizer, there was added enough ammonium nitrate (AN) to bring the total to 100 parts by weight. The added oxidizer helps to thicken up the slurry further. Using a combination of 0.20% of sodium dichromate and 0.02% of catechol to cross-link the gum in solution, a composition of good stability was produced. The gel had good stability with a nice, strong rubbery cross-link. By contrast, using 2.1% of tapioca flour designated T–36, plus 0.2% of guar gum designated "J–100" in the dry mix, plus 0.2 parts of guar gum pre-dispersed in the original solution, the cost of thickener was substantially more and the results were not as good. The initial appearance of the slurry was quite tacky, but there was little or no cross-linking; however, the use of Chilean sodium nitrate instead of the commercial U.S. grades of sodium nitrate (SN) which include less impurities, appeared to introduce a slight cross-link. The total cost of thickener and cross-linking agents in these slurries was reduced as much as 40 to 70% by use of the redox system employing either catechol or potassium antimony tartrate in combination with sodium dichromate.

No supplement oxidizer such as AN or SN was added in dry form to the two hot weather mixes. In all the other mixes, a part of the oxidizer is added in dry particulate form after the "pre-mix" of fuels is well dispersed in the solution. Otherwise, good dispersion of these materials may not be practical. Mixes Nos. 2 and 3 in Table IV were designed for moderate temperatures and Nos. 4 and 5 for cold weather.

For the purposes of Table IV, the precise materials or proportions of ingredients in the "pre-mix" used are not particularly important. In general, typical pre-mixes may contain sulfur, gilsonite or ground bituminous coal and particulate metallic aluminum. Specific pre-mixes do not greatly affect the cross-linking. The compositions may or may not contain up to about 2 to 2.5% of starch or of tapioca flour and these ingredients may affect stability of the gel. Composition No. 5 below is an example of a system using a combination of tapioca flour with a small amount of gum in the solution, both being cross-linked with borax.

more of the following and may be used in total proportions from about 40% to 89.9%, preferably 45 to 65% by weight of total composition: ammonium nitrate,

TABLE IV

|  | AN | SN | $H_2O$ | Pre-mix Guar | | | Gum | Cross-linker or Stabilizer [1] | | | Results |
|---|---|---|---|---|---|---|---|---|---|---|---|
|  |  |  |  | Gum | EG |  |  | N-O | Re | Re-2 |  |
| No. 1 | 54 | 15 | 15 | .3 | -------- | | 11 | .25 | .2 | -------- | .02 | 160 good stability. |
| No. 1A | 54 | 15 | 15 | .25 | 0.5 | | 11 | .25 | 0.1 | -------- | 0.01 | 180 good stability. |
| No. 2 | 42 | 15 | 15 | .23 | 0.4 | | 13 | .25 | .2 | .005 | .02 | 160 good stability. |
| No. 3 | 42 | 15 | 15 | .23 | 0.4 | | 13 | .25 | .05 | .0015 | -------- | 180 poor stability. |
| No. 4 | 31.5 | 13.5 | 15 | .18 | 0.4 | | 15 | .75 | .2 | .008 | .02 | 170 initially tacky. Less stable than #2. |
| No. 5 | 31.5 | 13.5 | 15 | .18 | 0.4 | | 15 | 1.5 | flour/.02 | | Borax | 150 much more body than #1 and #2. Stability excellent. |

[1] In general, the stabilizer includes some guar gum in addition to that in the solution, plus oxidizer (sodium dichoromate) and reducer. N-O is 50/50 aqueous sodium dichromate; Re is potassium antimony tartrate; Re-2 is gallic acid unless indicated otherwise.

In mixes Nos. 1 and 1A no dry oxidizer was added whereas in Nos. 2 and 3 about 12 to 14% of dry ammonium nitrate was added and in Nos. 4 and 5 about 23 to 24% of dry ammonium nitrate. These dry salts were stirred in simultaneously with the "pre-mix."

Considerable savings in cost of thickening may be realized by the use of the redox cross-linking system, with small amounts of gum especially when the latter is pre-hydrated in the solution. For thickening slurry of AN base, using about 0.25% of guar gum with cross-linkers costs 40 to 70% less than use of a combination of gum and starch in similar compositions, even though the unit cost of starches, tapioca flour, etc., is much less.

In summary, the invention comprises the use of two cross-linker reactants, one reducing agent and the other an oxidizer, in very small proportions, to cross-link the thickener in aqueous gels. Various gums and starches can be used, and the system is effective without having too much regard to the pH of the whole composition. This system is applicable to various gels and colloids, including some foodstuffs, as well as explosive gels. It has particular utility in the latter. The oxidizing agents and the reducing agents which react together, both tend as a rule to be somewhat astringent in character. The former are typical metal salt type gel insolubilizers, preferably such as the ammonium and alkali metal dichromates and permanganates. The reducers are generally hydroxyl-bearing organic compounds selected from the aliphatic and aromatic or alkyl-aromatic acids and their salts, particularly those containing plural hydroxyl groups. Materials such as gallic acid, particularly, and tannic acid, tartaric acid, or hydroxylated benzenes such as catechol or 1.2-benzenediol are useful. It appears that those hydroxylated compounds, either aliphatic or aromatic, which have their hydroxyl groups in ortho or other close positions, are superior. This may possibly be due to steric hindrance, although this is not positively known. The observed superiority of gallic acid over tannic acid may be due to the close positioning of three hydroxyl groups on the benzene ring. The salts of these materials appear to be generally as satisfactory as the acids and in some cases they are superior. An example is the marked superiority of potassium antimony tartrate over simple tartaric acid, due probably to the particular metals involved. Citric acid, with its single hydroxyl group, appears to be less effective than polyhydroxylated organic compounds, but some of its salts appear to be more useful.

The thickened gel compositions, in general, will contain aqueous solutions of various water solubles. For explosives, at least part of their strong soluble primary oxidizer salts will be in aqueous solution; enough solution is employed in such to form a substantially continuous liquid phase in the finished slurry. Fuels and sensitizers, particulate in character and undissolved to a substantial extent, are suspended in the explosive gels or slurries with at least reasonably homogeneity. These energy-contributing materials should be used in proportions suitable to bring overall oxygen balance of the explosive gel within about ±50%, more preferably within ±20%. The main oxidizer salts which can be used may comprise any one or more sodium nitrate, barium nitrate, and the ammonium and alkali metal chlorates and perchlorates. The fuels, which make up the bulk of the "pre-mix" and are sensitizers by nature, may comprise one or more of ingredients including fine or paint grade aluminum powder in very small quantities, granulated or flaked aluminum or larger particle size than paint grade, in larger proportions, sulfur, up to 10% or more, carbonaceous materials such as finely ground or granulated gilsonite, coal, coke, carbon black, wood particles, sugar, and starches or flours in proportions up to 10 or 12%, or even more. As thickeners the organic and argillaceous flours and starches, and/or galactomannan gums and their equivalents, including such materials as carboxymethyl cellulose, etc., may be used singly or in combination, but preferably at least part of the thickener is a galactomannan gum and at least some of the gum is preferably incorporated in the solution and hydrated, i.e. "pre-incorporate," before the dry "pre-mix" of fuels and other solids is added. When a fine grade of aluminum is used, the quantity may be as little as 0.1% or less, for example, or total fuel may amount to as much as 40% or more of the total composition. The solvent, which usually is either water or a preponderantly aqueous solution or emulsion of an organic liquid, preferably water compatible, such as the lower aliphatic alcohols, glycols, amines or amides such as formamide, or the like, as known in the art, preferably comprises about 10 to about 25% by weight of the total gel or slurry. Thickener and cross-linkers will comprise at least 0.01 and preferably about 0.05 to 5% of the total, as previously indicated, but the cross-linker material per se may be only a trace or as little as 0.0001% or less, up to 1% in some cases. These are usually salts but acids or other compounds (including $H_2O_2$ as oxidizer) may be used.

It will be understood that in addition to the several compositions described above, various other modifications, variations, additions and substitutions may be made in the gel or slurry compositions of this invention without departing from the spirit of the invention. It is intended by the claims which follow to cover such of these as would readily occur to those skilled in the art, as far as the prior art properly permits.

What is claimed is:

1. A sensitized or fueled aqueous explosive gel or slurry composition which comprises a fluid phase made up of about 10 to 25% by weight, based on the total, of water which contains in solution at least 10 to 60% of an oxidizing salt component selected from the group which consists of ammonium and alkali and alkaline earth metal nitrates, and ammonium and alkali metal chlorates and perchlorates, and mixtures of any two or more thereof, a thickener for said fluid which comprises .01 to 5% of an organic colloidal thickener, and from a trace up to 1% of oxidizer-reducer cross-linking agent which includes an alkali metal compound selected from the group which consists of chromic and manganese as the oxidizer for said thickener.

2. Composition according to claim 1 which contains 40 to 89.9% by weight, based on the total composition, of at least one of said strong oxidizer salts.

3. Composition according to claim 1 wherein the colloidal thickener is a galactomannan gum and the oxidizer-reducer agent is a combination of a chromic alkali metal compound and a hydroxylated organic compound in total proportions of 0.0001 to 1% by weight.

4. Composition according to claim 1 wherein the thickener comprises guar gum.

5. Composition according to claim 4 wherein the cross-linking agent is a combination of sodium dichromate and potassium antimony tartrate.

6. Composition according to claim 4 wherein the cross-linking agent comprises a polyhydroxylated benzene ring nucleus.

7. Composition according to claim 1 which comprises 10 to 25% by weight of water, 40 to 65% of said oxidizer, 10 to 50% of a particulate solid fuel which is insoluble to a substantial extent in said water, a gel-forming material which includes at least 0.01% of guar gum, a small amount of cross-linking salt selected from the alkali metal chromates, dichromates and permanganates, and a small amount of a polyhydroxylated organic material capable of forming an oxidizer-reducer reaction with said cross-linking salt to stabilize the formed gel.

8. Composition according to claim 1 wherein enough fuel is added to bring oxygen balance within ±50%.

9. Composition according to claim 8 wherein the fuel includes a sensitizer comprising at least 0.01% of finely divided metallic aluminum.

10. A method of stably cross-linking gum thickened sensitized or fueled aqueous explosive gel suspensions of insoluble particles which comprises first incorporating a small amount of colloidal thickening agent in an aqueous phase which contains an oxidizer salt selected from the group which consists of ammonium and alkali and alkaline earth metal nitrates and ammonium and alkali metal chlorates and perchlorates and mixtures of any two or more thereof, suspending insoluble fuel particles in said aqueous phase, and thereafter employing less than 1% by weight based on the total composition of a combination of an oxidizing alkali metal compound selected from the group which consists of chromic and manganese oxidizers as a first cross-linker material and a hydroxylated organic reducing second cross-linker material to stabilize the thickening agent.

11. Method according to claim 10 wherein the alkali metal compound is sodium dichromate.

12. Method according to claim 10 wherein the hydroxylated organic material is gallic acid.

13. Method according to claim 10 wherein the reducing agent is potassium antimony tartrate.

References Cited

UNITED STATES PATENTS

| | | | |
|---|---|---|---|
| 3,072,509 | 1/1963 | Barnhart et al. | 149—60 X |
| 3,097,120 | 7/1963 | Hoffman et al. | 149—60 X |
| 3,097,121 | 7/1963 | Bowkley et al. | 149—60 |
| 3,202,556 | 8/1965 | Chrisp | 149—20 |
| 3,214,307 | 10/1965 | Logan et al. | 149—60 X |
| 3,312,578 | 4/1967 | Craig | 149—60 X |
| 3,326,733 | 6/1967 | Colegrove | 149—20 |
| 3,331,717 | 7/1967 | Cook et al. | 149—44 X |
| 3,350,246 | 10/1967 | Fee et al. | 149—44 X |
| 3,379,587 | 4/1968 | Cook | 149—44 X |

BENJAMIN R. PADGETT, Primary Examiner

STEPHEN J. LECHERT, Assistant Examiner

U.S. Cl. X.R.

149—60, 61, 70, 71, 75, 76, 77, 82, 83, 85; 179—40, 42, 43, 44